(12) United States Patent
Tassitino, Jr. et al.

(10) Patent No.: US 6,549,440 B2
(45) Date of Patent: Apr. 15, 2003

(54) AC POWER SUPPLY APPARATUS AND METHODS PROVIDING OUTPUT CONTROL BASED ON ESTIMATED INSTANTANEOUS REACTIVE POWER

(75) Inventors: Frederick Tassitino, Jr., Wake Forest, NC (US); Pasi Taimela, Raleigh, NC (US)

(73) Assignee: Powerware Corporation, Raleigh, NC (US)

(*) Notice: Subject to any disclaimer, the term of this patent is extended or adjusted under 35 U.S.C. 154(b) by 0 days.

(21) Appl. No.: 09/908,990

(22) Filed: Jul. 19, 2001

(65) Prior Publication Data

US 2003/0016548 A1 Jan. 23, 2003

(51) Int. Cl.$^7$ ............................................. H02M 7/537
(52) U.S. Cl. ...................................................... 363/131
(58) Field of Search ................... 363/71, 131; 323/205, 323/207; 307/52, 60, 82

(56) References Cited

U.S. PATENT DOCUMENTS

| | | | |
|---|---|---|---|
| 4,590,416 A | * | 5/1986 | Porche et al. ............... 323/205 |
| 5,473,528 A | * | 12/1995 | Hirata et al. .................. 363/71 |
| 5,745,356 A | | 4/1998 | Tassitino, Jr. et al. |
| 5,880,947 A | * | 3/1999 | Imanaka et al. ............... 363/89 |
| 6,297,977 B1 | * | 10/2001 | Huggett et al. ................ 363/65 |

OTHER PUBLICATIONS

Chandorkar et al., "Control of Parallel Connected Inverters in Standalone ac Supply Systems," IEEE Transactions on Industry Applications, vol. 29, No. 1, Jan./Feb. 1993.

Tuladhar et al., "Parallel Operation of Single Phase Inverter Modules With No Control Interconnections," IEEE 12$^{th}$ Applied Power Electronics Conference, vol. 1, 1997, pp. 94–100.

* cited by examiner

*Primary Examiner*—Adolf Deneke Berhane
(74) *Attorney, Agent, or Firm*—Myers Bigel Sibley & Sajovec (57) ABSTRACT

An AC power supply, e.g., an uninterruptible power supply (UPS), includes an output, a reference signal generator circuit operative to generate a reference signal representative of a desired voltage waveform at a node connected to the output, a power determiner circuit operative to generate an estimate of instantaneous reactive power transferred between the output and the node, and a reference signal compensator circuit responsive to the reference signal generator circuit and to the power determiner circuit and operative to generated a compensated reference signal from the reference signal responsive to the estimate of instantaneous reactive power. An AC voltage generator circuit is responsive to the reference signal compensator and operative to transfer current between the output and the node responsive to the compensated reference signal. For example, the AC voltage generator circuit may include a controlled inverter that includes an output voltage control loop that receives the compensate reference signal at a reference input thereof. Related methods are also described.

45 Claims, 8 Drawing Sheets

AC POWER SUPPLY APPARATUS AND METHODS PROVIDING OUTPUT CONTROL BASED ON ESTIMATED INSTANTANEOUS REACTIVE POWER

BACKGROUND OF THE INVENTION

The present invention relates to AC power supply apparatus and methods, and more particularly, to apparatus and methods for controlling the output of an AC power supply load in load sharing applications.

Uninterruptible power supplies (UPSs) are power conversion devices that are commonly used to provide conditioned, reliable power for computer networks, telecommunications networks, medical equipment and the like. UPSs are widely used with computers and similar computing devices, including but not limited to personal computers, workstations, mini computers, network servers, disk arrays and mainframe computers, to insure that valuable data is not lost and that the device can continue to operate notwithstanding temporary loss of an AC utility source. UPSs typically provide power to such electronic equipment from a secondary source, such as a battery, in the event that a primary alternating current (AC) utility source drops out (blackout) or fails to provide a proper voltage (brownout).

In some UPS applications, it may be desirable to parallel connect the outputs of multiple UPSs to provide increased capacity and/or redundancy. A common difficulty in such parallel redundant operation is achieving desirable load sharing among the parallel-connected UPSs. In particular, parallel connection of UPS units that actively regulate their output voltages may lead to overloading of some units and underloading of others. In addition, currents flowing between parallel-connected UPSs may have undesirable effects. For example, in parallel-connected UPSs that use output inverters that generate AC output voltages from intermediate DC links, currents flowing between the parallel-connected UPSs can lead to undesirable increases in voltages on selected ones of the DC links.

Several approaches for dealing with such load sharing issues have been proposed. For example, U.S. Pat. No. 5,745,356 to Tassitino, Jr. et al. describes several techniques for load sharing control, including a "difference from average" technique that involves signaling between parallel-connected UPSs, as well as other techniques that do not require such interunit signaling. So-called "droop" techniques for providing load sharing in parallel-connected AC power supply systems are described in "Parallel Operation of Single Phase Inverter Modules With No Control Interconnections," by Tuladhar et al., *Proceeding of 1997 IEEE Applied Power Electronics Conference*, vol. 1, pp. 94–100 (1997), and in "Control of Parallel Connected Inverters in Standalone AC Supply Systems," by Chandorkar et al., *IEEE Transactions on Industry Applications*, vol. 29, no. 1, January/February 1993.

Although conventional techniques can be effective in achieving desirable load sharing and other characteristics in parallel redundant applications, there is an ongoing need for practical and effective techniques for controlling parallel-connected AC power supplies.

SUMMARY OF THE INVENTION

According to some embodiments of the invention, an AC power supply includes an output, a reference signal generator circuit operative to generate a reference signal representative of a desired voltage waveform at a node connected to the output, a power determiner circuit operative to generate an estimate of instantaneous reactive power transferred between the output and the node, and a reference signal compensator circuit responsive to the reference signal generator circuit and to the power determiner circuit and operative to generated a compensated reference signal from the reference signal responsive to the estimate of instantaneous reactive power. The AC power supply further includes an AC voltage generator circuit responsive to the reference signal compensator and operative to transfer current between the output and the node responsive to the compensated reference signal. For example, the AC voltage generator circuit may include a controlled inverter that includes an output voltage control loop that receives the compensated reference signal at a reference input thereof.

In some embodiments of the invention, the power determiner circuit may be operative to generate the estimate of instantaneous reactive power from an estimate of instantaneous current and an estimate of instantaneous voltage at the output of the AC power supply. The reference signal may include a first sinusoidal reference signal having a frequency and phase indicative of a frequency and phase of the desired voltage waveform at the node. The power determiner circuit may include a first multiplier operative to multiply the first sinusoidal reference signal by an estimate of voltage (e.g., RMS voltage) at the output to produce a second sinusoidal reference signal representative of the instantaneous voltage. The power determiner circuit may further include a phase shifter circuit operative to process the second sinusoidal reference signal to produce a third sinusoidal reference signal that is quadrature phase shifted with respect to the second sinusoidal reference signal, and a second multiplier operative to multiply the third sinusoidal reference signal by the estimate of instantaneous current to produce the estimate of instantaneous reactive power.

In further embodiments of the invention, the reference signal compensator circuit is operative to generate the compensated reference signal by time-shifting and/or amplitude modulating the reference signal responsive to the estimate of instantaneous reactive power. For example, in some embodiments the reference signal includes a first periodic signal and the reference signal compensator circuit is operative to amplitude modulate the first periodic signal responsive to the estimate of instantaneous reactive power to generate a second periodic signal. The AC voltage generator circuit is operative to control current transfer between the output and the node responsive to the second periodic signal. In addition to such reactive power compensation, in some embodiments, the power determiner circuit is operative to generate an estimate of instantaneous real power transferred between the output and the node, and the reference signal generator circuit is operative to amplitude modulate the first periodic signal responsive to the estimate of instantaneous reactive power and the estimate of instantaneous real power.

According to other embodiments of the invention, the reference signal compensator circuit is operative to process an RMS voltage reference signal according the estimate of instantaneous reactive power to generate a compensated RMS voltage reference signal. The power supply further includes an RMS voltage determiner circuit operative to generate an RMS voltage signal representative of an RMS voltage at the output, a summing circuit that generates an RMS voltage error signal from the RMS voltage signal and the compensated RMS voltage reference signal, and an RMS voltage compensation circuit operative to process the RMS voltage error signal according to a predetermined compensation to produce an RMS voltage compensation signal. The reference signal compensator circuit is further operative to amplitude modulate the first periodic signal according to the RMS voltage compensation signal to produce the second periodic signal. The reference signal compensator circuit may be further operative to time shift and/or amplitude modulate the first periodic signal responsive to the estimate of instantaneous reactive power to generate a compensated periodic signal and to generate the compensated RMS voltage reference signal responsive to the compensated periodic signal.

In still other embodiments of the invention, the reference signal compensator circuit is operative to generate a first sinusoidal signal from the reference signal and to amplitude modulate the first sinusoidal signal responsive to the estimate of instantaneous reactive power to generate a second sinusoidal signal. The AC voltage generator circuit is operative to control current transfer between the output and the node responsive to the second sinusoidal signal. The reference signal compensator circuit may be further operative to time shift the first sinusoidal signal responsive to the estimate of instantaneous reactive power. The reference signal compensator circuit may also be operative to time shift the first sinusoidal signal responsive to the estimate of instantaneous reactive power and to an estimate of instantaneous real power transferred between the output and the node.

In some embodiments of the invention, the reference signal includes a first index signal. The reference signal compensator circuit includes a first compensation circuit operative to process the estimate of instantaneous reactive power according to a first compensation to generate a first compensation signal. The reference signal compensator circuit further includes a summing circuit operative to modify the first index signal responsive to the first compensation signal factor to produce a second index signal that is time-shifted with respect to the first index signal. A sine lookup table circuit is operative to generate the first sinusoidal signal responsive to the second index signal, and a second compensation circuit is operative to process the estimate of instantaneous reactive power according to a second compensation to produce a second compensation signal. A multiplier circuit is operative to amplitude modulate the first sinusoidal signal responsive to the second compensation signal to produce the second sinusoidal signal.

The reference signal compensator circuit may further include a third compensation circuit operative to process an estimate of instantaneous real power transferred between the output and the node according to a third compensation to produce a third compensation signal and a fourth compensation circuit operative to process the estimate of instantaneous real power according to a fourth compensation to produce a fourth compensation signal. The summing circuit may be operative to modify the first index signal responsive to the first and third compensation signals to produce the second index signal. The multiplier circuit may be operative to amplitude modulate the first sinusoidal signal responsive to the second and fourth compensation signals to generate the second sinusoidal signal.

According to other aspects of the invention, an uninterruptible power supply (UPS) includes a DC voltage generator circuit configured to connect to a primary power source (e.g., an AC utility source) and to an auxiliary power source (e.g., a battery) and operative to produce a DC voltage at a DC bus from primary power source and/or the auxiliary power source. A controlled inverter is coupled to the DC bus and operative to produce an AC voltage at an output thereof from the DC voltage on the DC bus responsive to a signal applied to a reference input of the controlled inverter. The UPS also includes a reference signal generator circuit operative to generate a reference signal representative of a desired voltage waveform at a node connected to the output of the controlled inverter. The UPS also includes a power determiner circuit operative to generate an estimate of instantaneous reactive power transferred between the output of the inverter and the node. The UPS further includes a reference signal compensator circuit responsive to the reference signal generator circuit and to the power determiner circuit and operative to generate a compensated reference signal at the reference input of the controlled inverter from the reference signal responsive to the estimate of instantaneous reactive power.

According to method aspects of the invention, a reference signal representative of a desired voltage waveform at a node connected to an output of an AC power supply is generated. The reference signal is modified responsive to an estimate of instantaneous reactive power transferred between the output and the node to generate a compensated reference signal. Current transfer between the output and the node is controlled responsive to the compensated reference signal. In particular, the reference signal may be modified by time-shifting and/or amplitude modulating the reference signal responsive to the estimate of instantaneous reactive power, which may be generated from an estimate of instantaneous current and an estimate of instantaneous voltage at the output of the AC power supply. The reference signal may also be modified responsive to an estimate of instantaneous real power.

Embodiments of the invention can provide improved power transfer control, particularly in applications in which parallel-connected AC power supplies, such as UPSs, are used to provide power to a load at a common node. In particular, by controlling current transfer to the load based on an estimate of instantaneous power, embodiments of the invention can reduce uneven current sharing and can limit voltage increases at inverter input busses. In addition, because such control can be implemented within a high-speed output voltage control loop, some embodiments of the invention can also account from multiple harmonics.

DETAILED DESCRIPTION

Specific embodiments of the invention now will be described more fully with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIGS. 1–8 are block diagrams that illustrate control structures and operations that may be used in embodiments of the invention. As presented, these control structures and operations have specific arrangements of compensation circuit, summer circuits, multiplier circuits and other control components and associated operations. However, it will be understood that these control structures and operations may be selectively rearranged, rescaled, inverted, and otherwise modified within the scope of the invention to provide equivalent control structures and operations to the specific control structures and operations illustrated herein. Accordingly, the present invention includes not only the specific control structures and operations described herein, but also equivalent control structures and operations.

It will be further appreciated that the embodiments of the invention may, in general, be embodied using analog control circuitry, digital control circuitry or combinations thereof. Some specific embodiments described herein are described as being implemented using "digital" control components, i.e., control components that implement a control structure in a discrete domain. Such functions may be implemented using digital electronic circuitry, including general-purpose computing devices such as microprocessors, microcontrollers, or digital signal processors (DSPs), and/or special-purpose devices, such as programmable gate arrays or application specific integrated circuits (ASICs). However, it will be further appreciated that many of the functions described herein may be implemented using equivalent "analog," i.e., continuous-domain, control techniques implemented in analog circuitry.

It will be appreciated that the invention is applicable to a variety of different types of AC power supply systems including, but not limited to, uninterruptible power supply (UPS) systems. It will be further appreciated that methods and apparatus according to the invention may be applied in single-phase and multi-phase (e.g., three-phase) embodiments.

Figure 1:
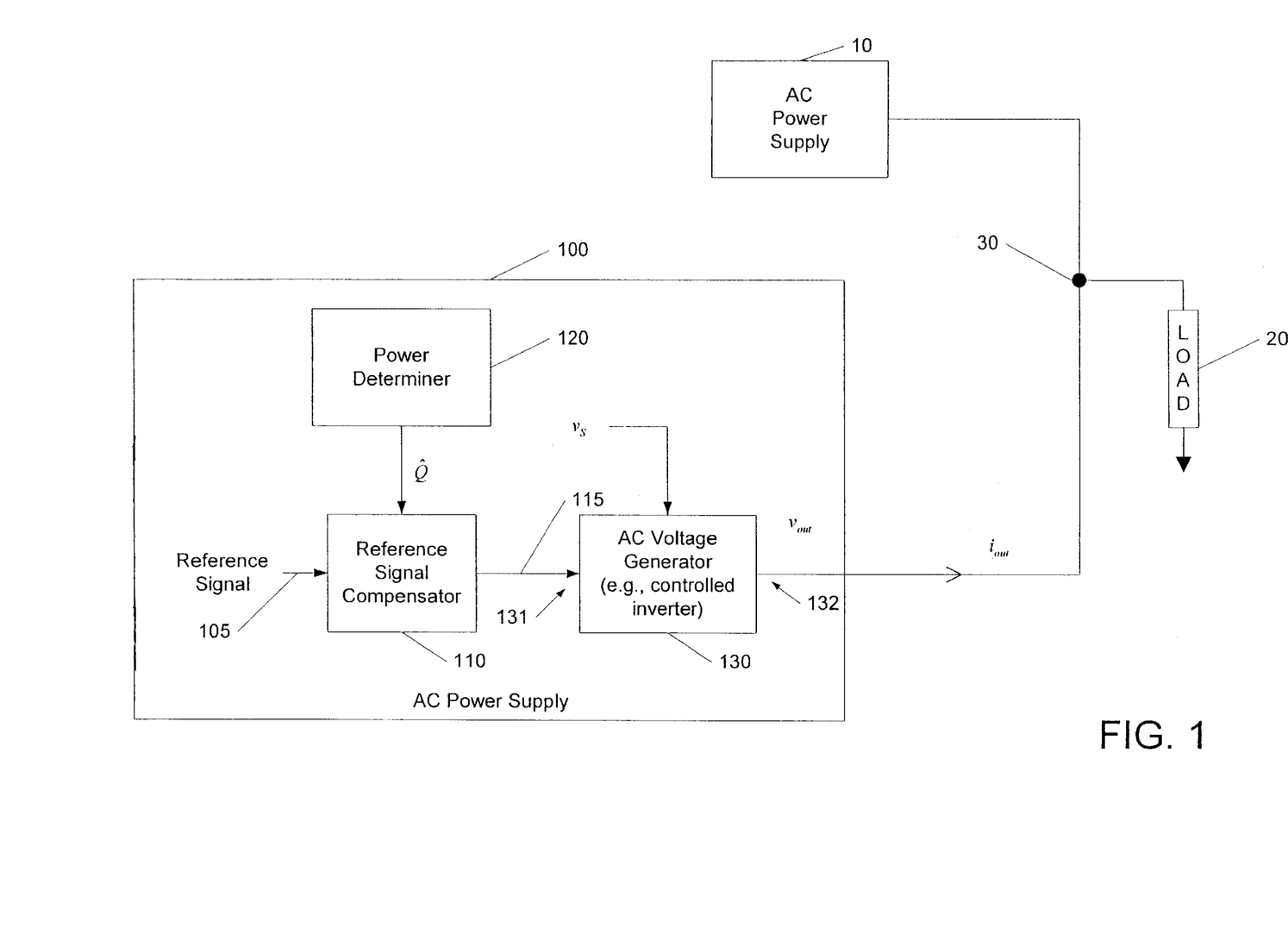
FIG. 1 is a schematic diagram of an AC power supply apparatus and operations according to embodiments of the invention in a parallel-connected environment.

FIG. 1 illustrates an AC power supply 100 according to embodiments of the invention. As shown, the AC power supply 100 is coupled to a load 20 and another AC power supply 10 at a node 30. The power supply 100 includes an AC voltage generator circuit 130 that produces an output voltage $v_{out}$ at an output 132 thereof from a voltage source $v_s$. In particular, the AC voltage generator circuit 130 controls an output current $i_{out}$ at the output 132 of the AC voltage generator circuit 130 and the node 30 responsive to a reference signal applied to a reference signal input 131 thereof. For example, the AC voltage generator circuit 130 may include a current mode controlled inverter, and the reference signal input 131 may include a reference voltage input to an outer voltage loop of the current mode controlled inverter.

The power supply 100 further includes a reference signal compensator circuit 110 that is operative to generate a compensated reference signal 115 that is applied to the reference signal input 131 of the AC voltage generator circuit 130. The reference signal compensator circuit 110 generates the compensated reference signal 115 by modifying a reference signal 105 that is representative of a desired voltage for the node 30 according to an estimate $\hat{Q}$ (a signal, such as a calculated digital value) of instantaneous reactive power transferred between the AC power supply 100 and the node 30. The estimate $\hat{Q}$ of instantaneous reactive power is generated by a power determiner circuit 120.

It will be appreciated the configuration of FIG. 1 is widely applicable. For example, the power supply 100 may comprise a uninterruptible power supply (UPS) that generates an AC output voltage from either an AC utility source or an auxiliary power supply, such as a battery or generator, and the second power supply 20 may comprise a second UPS or other AC power source. In other embodiments, the power supply 100 may comprise a series rectifier/inverter chain, as might be provided in a UPS, and the second supply 20 may comprise a bypass circuit of the same UPS that is operative to directly connect an AC utility source to the node 30. In such a configuration, embodiments of the invention may be used to jointly supply power to the node 30 via the bypass and the rectifier inverter chain.

Figure 2:
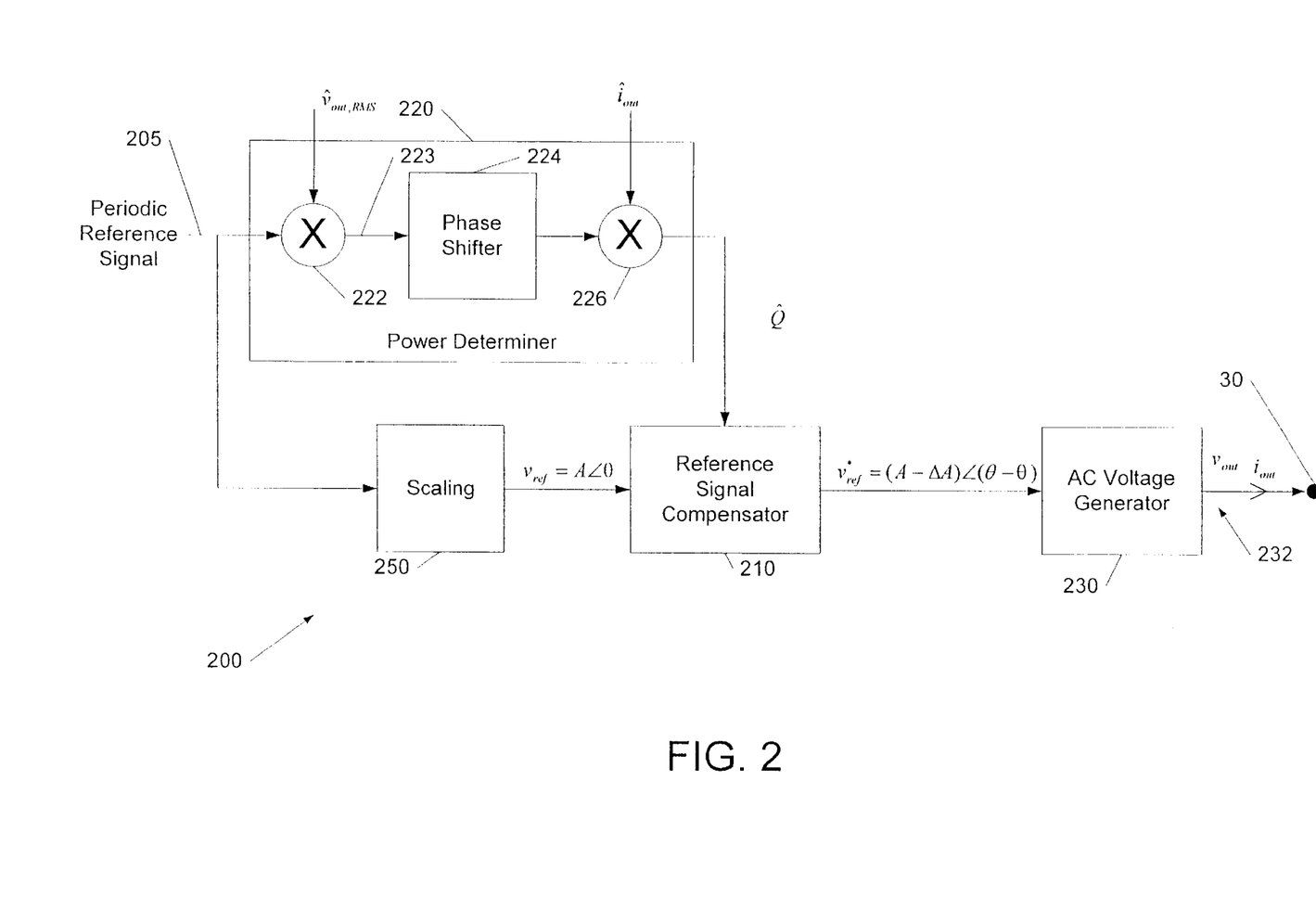
FIG. 2 is a schematic diagram illustrating an AC power supply apparatus and operations according to some embodiments of the invention.

According to some embodiments of the invention illustrated in FIG. 2, an AC power supply 200 includes a AC voltage generator circuit 230 that controls an output current $i_{out}$, between an output 232 thereof and a node 30, e.g., a node at which the AC power supply 200 is parallel-connected with one or more other AC power supplies. The power supply 200 further includes a power determiner circuit 220 that generates an estimate $\hat{Q}$ of instantaneous reactive power transferred between the output 232 of the AC voltage generator circuit 232 and the node 30 using a periodic reference signal 205 having a frequency and phase that is indicative of a desired voltage frequency and phase at the node 30. As shown, the power determiner circuit 220 includes a first multiplier circuit 222 that scales the reference signal 205 by an estimate $\hat{v}_{out,RMS}$ of the RMS value of the actual voltage $v_{out}$ at the output 232 of the AC voltage generator circuit 230 to generate a scaled signal 223 that is representative of the instantaneous voltage at the output 232. The scaled signal 223 is then phase-shifted approximately 90° by a 90° phase shifter circuit 224, and multiplied in a second multiplier circuit 226 by an estimate $\hat{i}_{out}$ of an actual output current $i_{out}$ passing between the output 232 of the AC voltage regulator circuit 230 and the node 30 to produce the estimate $\hat{Q}$ of instantaneous reactive power.

As shown, the power supply 200 further includes a scaling circuit 250 that scales the periodic reference signal 205 to an appropriate amplitude A to produce a periodic voltage reference signal $v_{ref}$, i.e., a periodic signal having a phase, frequency and magnitude representative of a desired voltage waveform for the node 30. The voltage reference signal $v_{ref}$ is applied to a reference signal compensator circuit 210 that generates a compensated reference signal $v^*_{ref}$ that is time-shifted and/or amplitude modulated based on the estimate $\hat{Q}$ of instantaneous reactive power. The compensated reference signal $v^*_{ref}$ is applied to an AC voltage generator circuit 230 that responsively produces the output current $i_{out}$.

Figure 3:
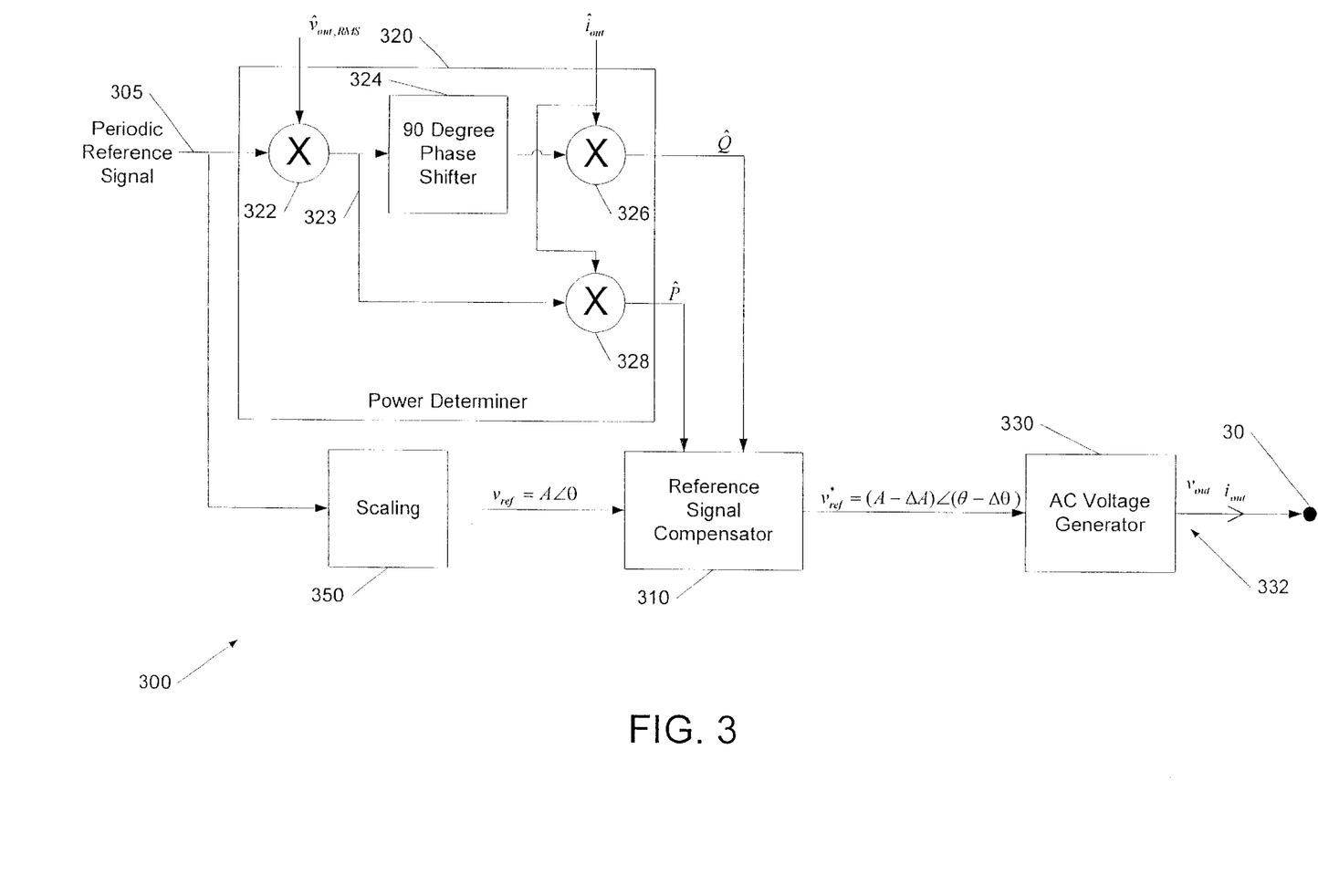
FIG. 3 is a schematic diagram illustrating an AC power supply apparatus and operations according to other embodiments of the invention.

According to other embodiments of the invention, a reference signal for a AC voltage generator circuit can be time shifted and/or amplitude modulated based on both reactive and instantaneous real power estimates, which can provide improved control of both voltage amplitude and phase at the output of the AC voltage generator circuit. As shown in FIG. 3, an AC power supply 300 according to some embodiments of the invention includes an AC voltage generator circuit 330 that controls an output current $i_{out}$ between an output 332 thereof and a node 30, e.g., a node at which the power supply 300 is parallel-connected to one or more other AC power supplies. The power supply 300 further includes a power determiner circuit 320 that generates an estimate $\hat{Q}$ of instantaneous reactive power transferred between the output 332 of the AC voltage generator circuit 330 and the node 30 and an estimate $\hat{P}$ of instantaneous real power transferred between the output 332 and the node 30. The power determiner circuit 320 includes a first multiplier circuit 322 that scales a periodic reference signal 305 by a representation $\hat{v}_{out,RMS}$ of an RMS value of the output voltage $v_{out}$ at the output 332, producing a signal 323 that is representative of an instantaneous voltage at the output 332. In a second multiplier 328, the signal 323 is multiplied by an estimate $\hat{i}_{out}$ of an output current $i_{out}$ passing between the output 332 and the node 30 to produce the estimate $\hat{P}$ of instantaneous real power transferred between the power supply 300 and the node 30. The signal 323 produced by the multiplier circuit 322 is also phase-shifted approximately 90° by a 90° phase shifter circuit 324, and multiplied in a third multiplier circuit 326 by an estimate it, of actual output current between the power supply 300 and the node 30 to produce the estimate $\hat{Q}$ of instantaneous reactive power transferred between the power supply 300 and the node 30.

The power supply 300 further includes a scaling circuit 350 that scales the periodic reference signal 305 to an appropriate amplitude A to produce a voltage reference signal $v_{ref}$. The voltage reference signal $v_{ref}$ is applied to a reference signal compensator circuit 310 that generates a compensated reference signal $v^*_{ref}$ that is modified in amplitude by an amount $\Delta A$ and in phase by an amount $\Delta \theta$, based on the estimate $\hat{P}$ of instantaneous real power and the estimate $\hat{Q}$ of instantaneous reactive power. The compensated reference signal $v^*_{ref}$ is applied to the AC voltage generator circuit 330 that responsively controls the output current $i_{out}$.

Figure 4:
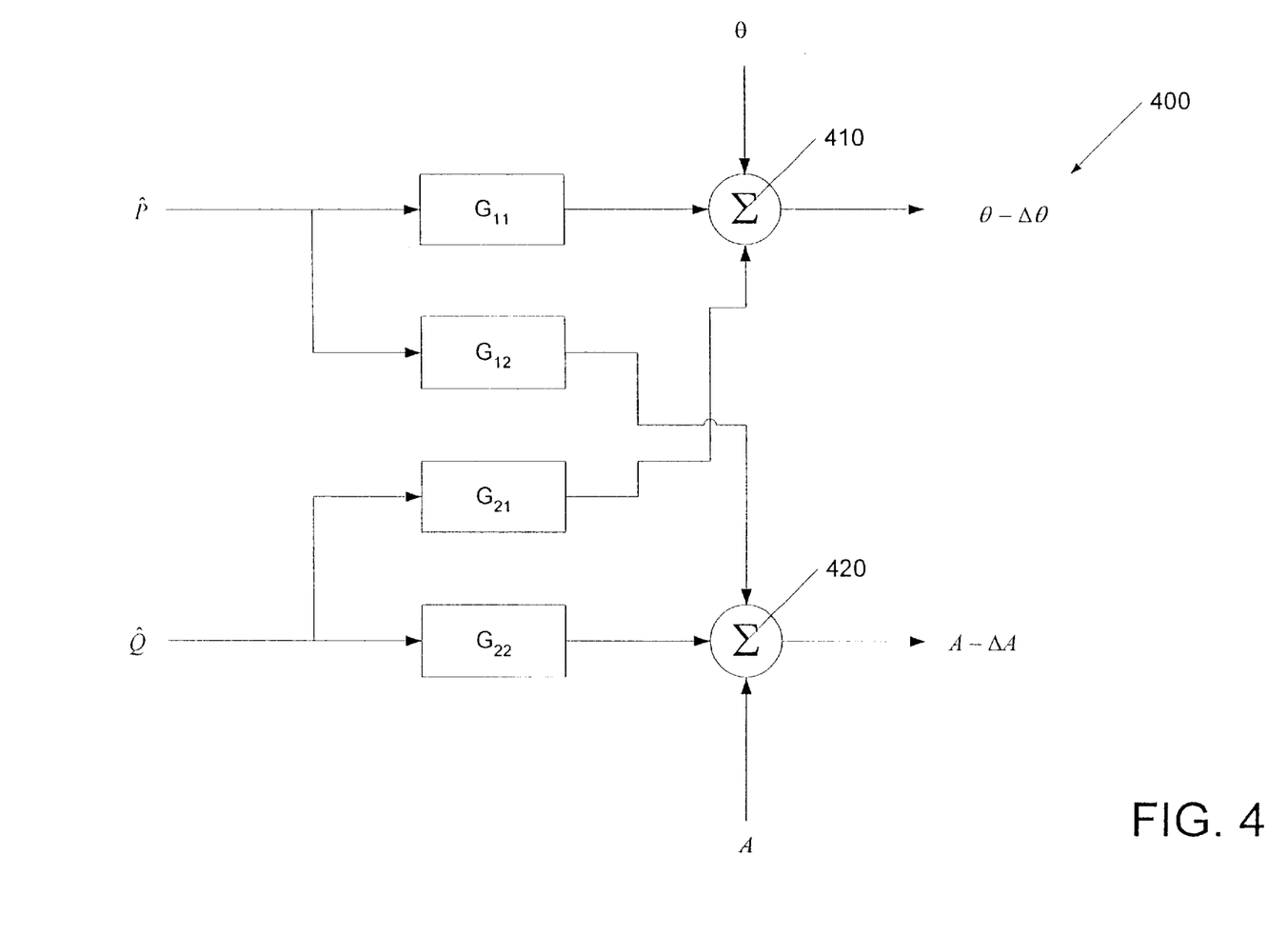
FIG. 4 is a schematic diagram illustrating a control structure for use in AC power supply apparatus and operations according to some embodiments of the invention.

FIG. 4 illustrates a generic control structure 400 for implementing reference signal compensation according to embodiments of the invention. An estimate $\hat{P}$ of instantaneous real power transferred by an AC power supply is processed according to a compensation G11 and an estimate $\hat{Q}$ of instantaneous reactive power transferred by the AC power supply is processed according to a compensation G21. The outputs of the compensation blocks G11, G21 are applied to a first summing junction 410, where they modify voltage phase information $\theta$ to produce modified voltage phase information $\theta - \Delta \theta$. Similarly, the estimate $\hat{P}$ of instantaneous real power is processed according to a compensation G12, and the estimate $\hat{Q}$ of instantaneous reactive power is processed according to a compensation G22. The outputs of the compensation blocks G12, G22 are applied to a second summing junction 420, where they modify voltage amplitude information A to produce modified voltage amplitude information $A - \Delta A$. The modified phase and amplitude information $\theta - \Delta \theta$, $A - \Delta A$ can be used as reference ("set point") inputs to a voltage controller, for example, a controlled inverter.

Figure 5:
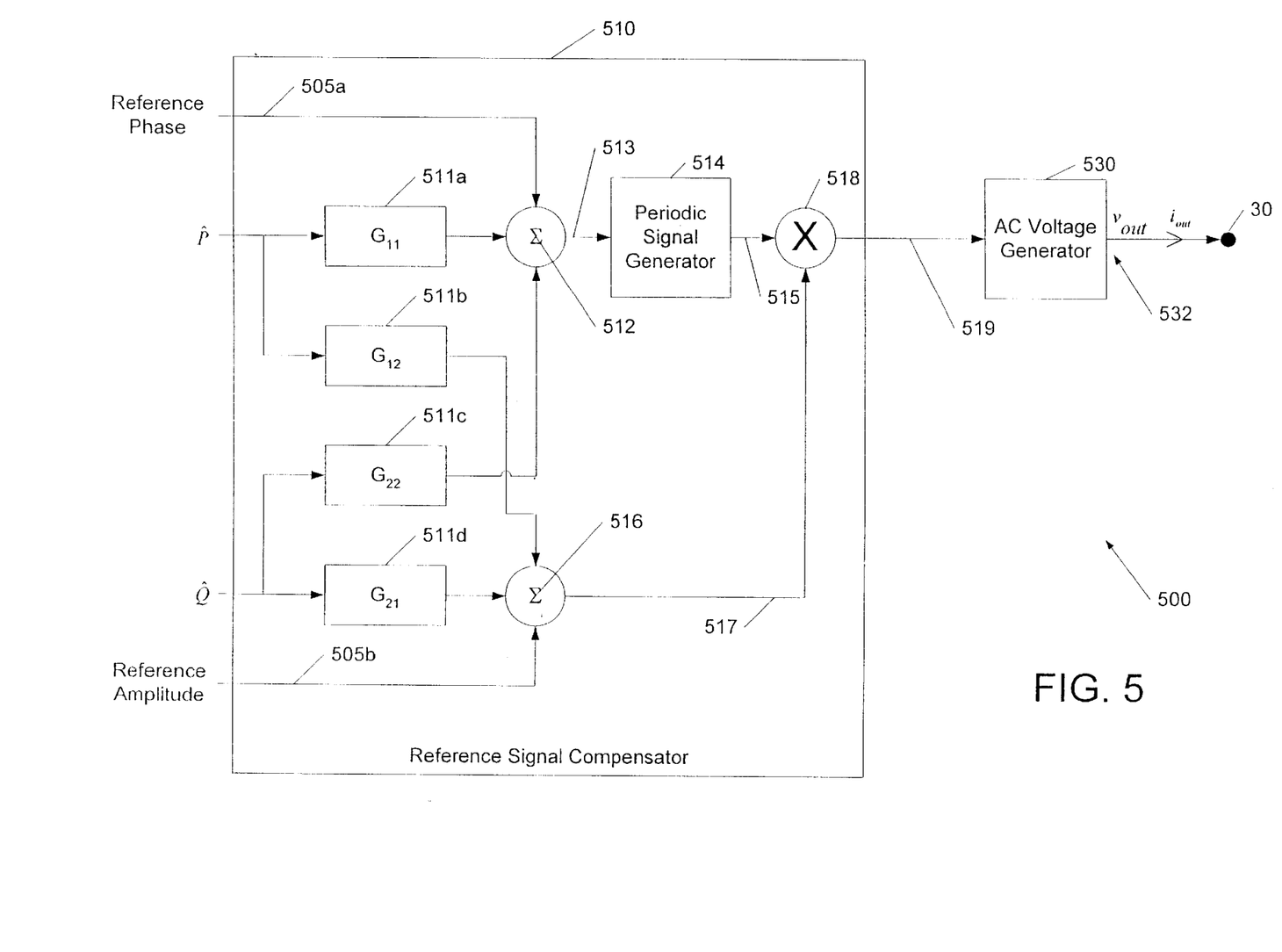
FIG. 5 is a schematic diagram illustrating an AC power supply apparatus and operations according to other embodiments of the invention.

According to embodiments of the invention illustrated in FIG. 5, an AC power supply can be configured to provide "fast" voltage control, i.e., voltage control having a bandwidth significantly greater than the fundamental frequency of the output voltage produced by the AC power supply. The AC power supply 500 includes an AC voltage generator circuit 530 that is operative to control a current $i_{out}$ between an output 532 thereof and a node 30, e.g., a node at which the power supply is parallel connected to one or more other AC power supplies. In particular, the AC voltage generator circuit 530 controls the current $i_{out}$ by tracking a sinusoidal AC voltage reference signal 519 applied thereto, for example, as is commonly done in a controlled inverter having an outer voltage control loop. The power supply 500 further includes a reference signal compensator circuit 510 that generates a sinusoidal instantaneous real and reactive power compensated reference signal 519 from reference phase and amplitude signals 505a, 505b that represent, respectively, a desired voltage phase and amplitude for the node 30. The compensated reference signal 519 is provided to a reference input of the AC voltage generator circuit 530.

As shown, estimates $\hat{P},\hat{Q}$ of instantaneous real and reactive power transferred between the output 532 of the AC voltage generator circuit 530 and the node 30 are provided to the reference signal compensator circuit 510, which includes compensation circuits 511a, 511b, 511c, 522d that provide respective compensations G11, G11, G21, G22. Outputs of the compensation circuits 511a, 511c are provided to a first summing circuit 512, where they modify the reference phase signal 505a, which may be, for example, an index signal that references values in a sine lookup table. The summing circuit 512 produces a periodic compensated phase reference signal 513 that is time-shifted with respect to the reference signal 505a responsive to the estimates $\hat{P},\hat{Q}$ of instantaneous real and reactive power. The compensated reference signal 513 is applied to a periodic signal generator circuit 514, which produces a sinusoidal reference signal 515 that is time-shifted based on the estimates $\hat{P},\hat{Q}$ of instantaneous real and reactive power. In other words, the combination of the summing circuit 512 and the periodic signal generator circuit 514 act to control the phase of the sinusoidal reference signal 515 responsive to the estimates $\hat{P},\hat{Q}$ of instantaneous real and reactive power. The compensations circuits 511a, 511b, 511c, 511d may comprise, for example, active proportional integrator/differentiator (PID) compensation circuits.

Outputs of the compensation circuits 511b, 511d are provided to a second summing circuit 516, where they modify the reference amplitude signal 505b to produce a compensated amplitude reference signal 517. The compensated amplitude reference signal 517 is used to amplitude modulate the sinusoidal signal 515 in a multiplier circuit 518 to produce the compensated reference signal 519 that is applied to the AC voltage generator circuit 530.

The fast control configuration illustrated in FIG. 5 may provide several advantages. In particular, when AC power supplies are operated in parallel, reactive currents typically flow among the parallel-connected AC supplies due to variations in the output impedance among the supplies. In addition, differences in phase and/or amplitude of the output voltages produced by parallel-connected AC supplies may lead, for example, to internal DC bus overvoltages in applications involving parallel-connected inverters. Reactive and/or instantaneous real power compensation in a fast voltage control loop according to embodiments of the invention can compensate for a broad range of harmonic currents.

Figure 6:
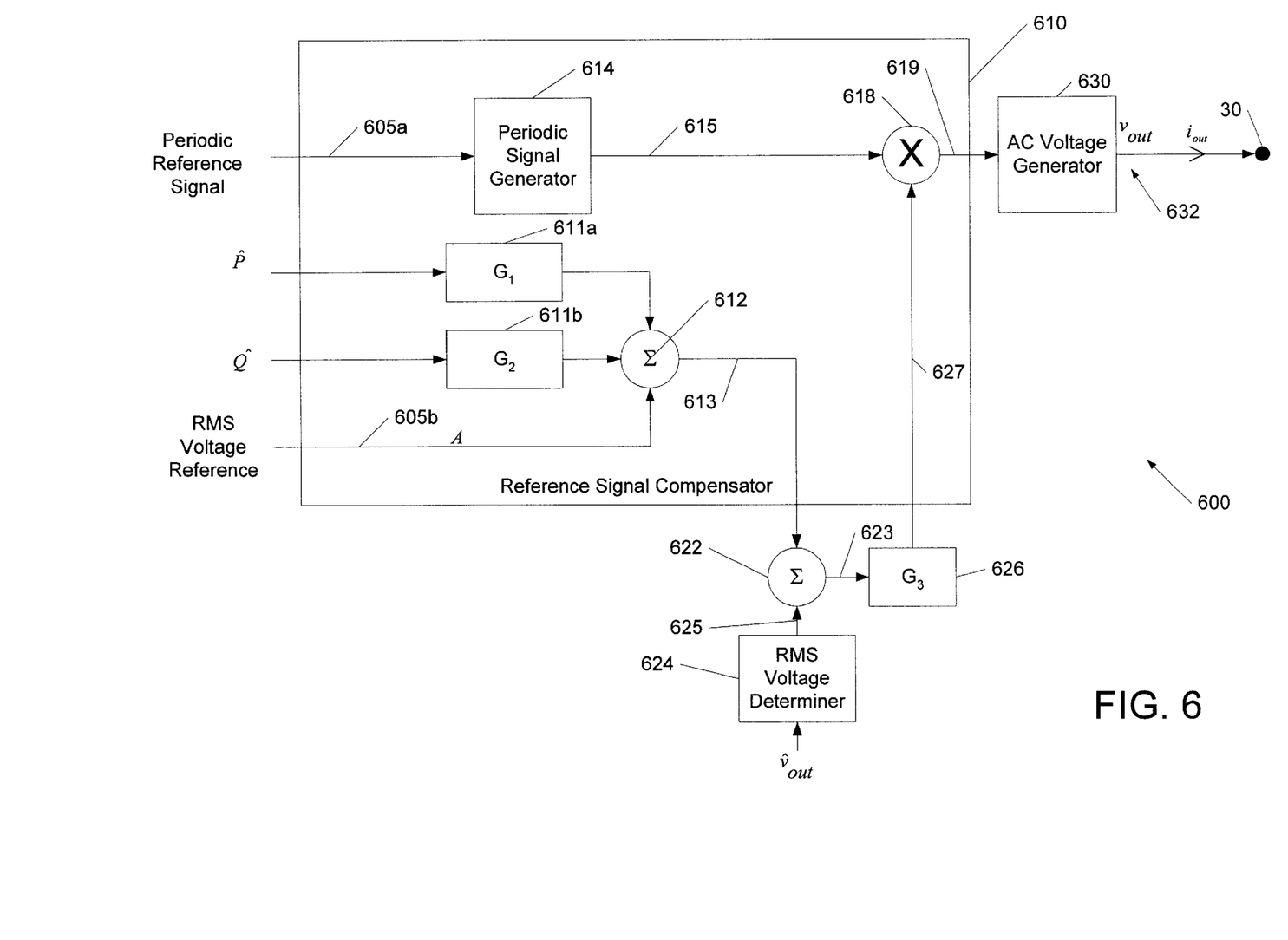
FIG. 6 is a schematic diagram illustrating an AC power supply apparatus and operations according to yet other embodiments of the invention.

In some applications, instantaneous power estimates may be used to compensate other types of control loops. For example, FIG. 6 illustrates a different approach according to the invention, in particular, one in which reactive and instantaneous real power information is used to modify a reference for a "slow" voltage control loop, i.e., a loop which acts to maintain a desired cumulative (multi-cycle) voltage characteristic, such as RMS voltage, at a parallel connection node. Such slow control can provide improved steady-state output voltage characteristics. Referring to FIG. 6, an AC power supply 600 according to some embodiments of the invention includes an AC voltage generator circuit 630 that is operative to control a current $i_{out}$ between an output 632 thereof and a node 30, e.g., a node at which the power supply 600 is parallel connected to one or more other AC power supplies. In particular, the AC voltage generator circuit 630 controls the current $i_{out}$ by tracking a sinusoidal AC voltage reference signal applied thereto, for example, as is commonly done in a controlled inverter having an outer voltage control loop. The power supply 600 further includes a reference signal compensator circuit 610 that generates a sinusoidal compensated reference signal 619 from reference phase and RMS reference signals 605a, 605b that are representative of a desired voltage phase and RMS (root mean square) voltage for the node 30. The compensated reference signal 619 is provided to a reference input of the AC voltage generator circuit 630.

The reference signal compensator circuit 610 includes a periodic signal generator circuit 614 that generates a sinusoidal signal 615 that is representative of the phase information in the phase reference signal 605a. As shown, estimates $\hat{P},\hat{Q}$ of instantaneous real and reactive power transferred between the output 632 of the AC voltage generator circuit 630 and the node 30 are provided to the reference signal compensator circuit 610, which includes compensation circuits 611a, 611b that provide respective compensations G1, G2. Outputs of the compensation circuits 611a, 611b are provided to a summing circuit 612, where they modify the RMS voltage reference signal 605b to produce a compensated RMS voltage reference signal 613 that is provided to the input of an RMS voltage control loop at a summing circuit 622.

The power supply 600 further includes an RMS voltage determiner circuit 624 that processes a signal $\hat{v}_{out}$ that represents an estimate of an actual (e.g., measured) voltage $v_{out}$ at the output 632 of the AC voltage generator circuit 630 to generate an RMS voltage feedback signal 625. This RMS voltage feedback signal 625 and the compensated RMS voltage reference signal 613 are applied to a summing circuit 622 that generates an RMS voltage error signal 623. The RMS voltage error signal 623 is applied to a compensation circuit 626 that provides a compensation G3 to produce a signal 627 that is used to amplitude modulate the sinusoidal signal 615 in a multiplier circuit 618. The multiplier circuit 618 produces the compensated reference signal 619 applied to the AC voltage generator circuit 630.

Figure 7:
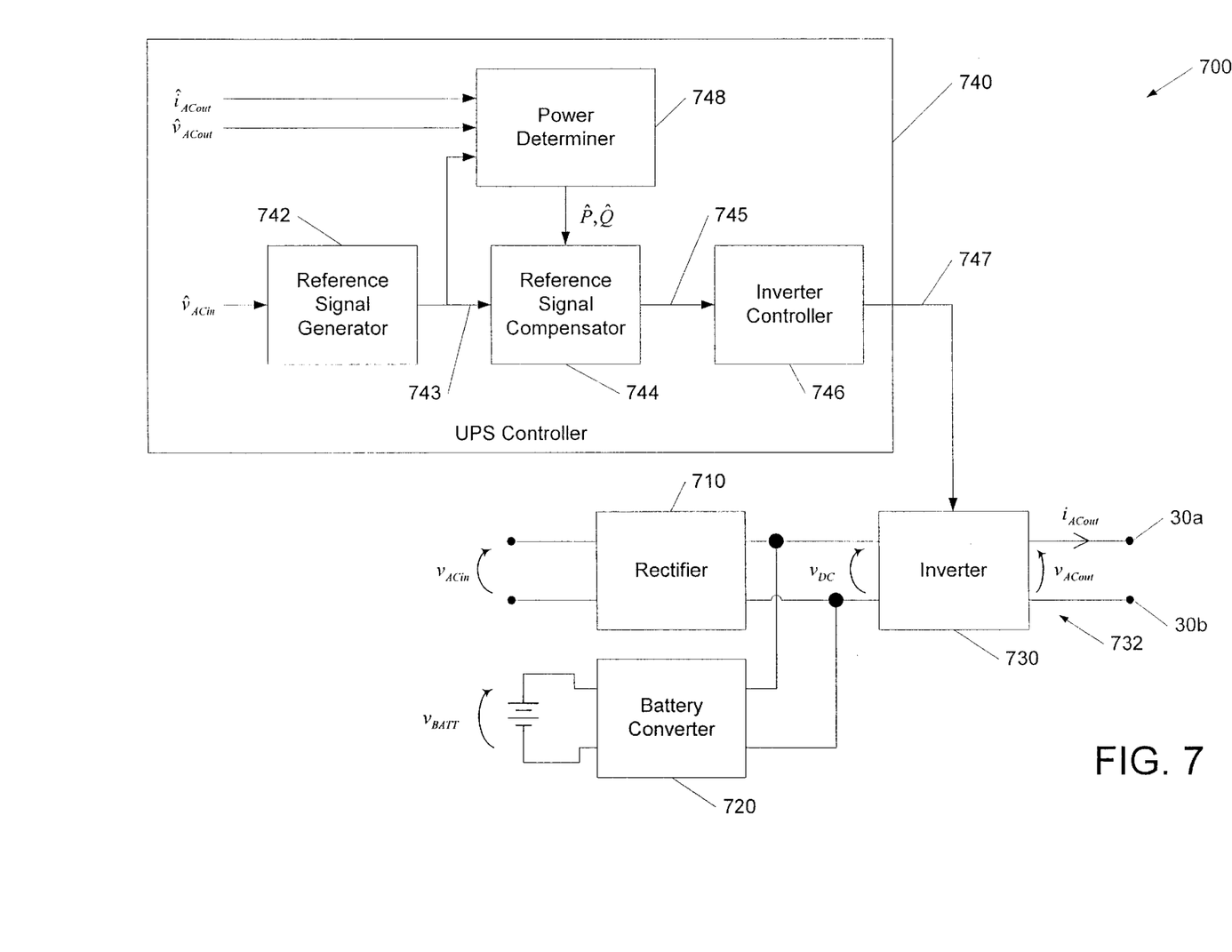
FIG. 7 is a schematic diagram illustrating an AC power supply apparatus and operations according to further embodiments of the invention.
Figure 8:
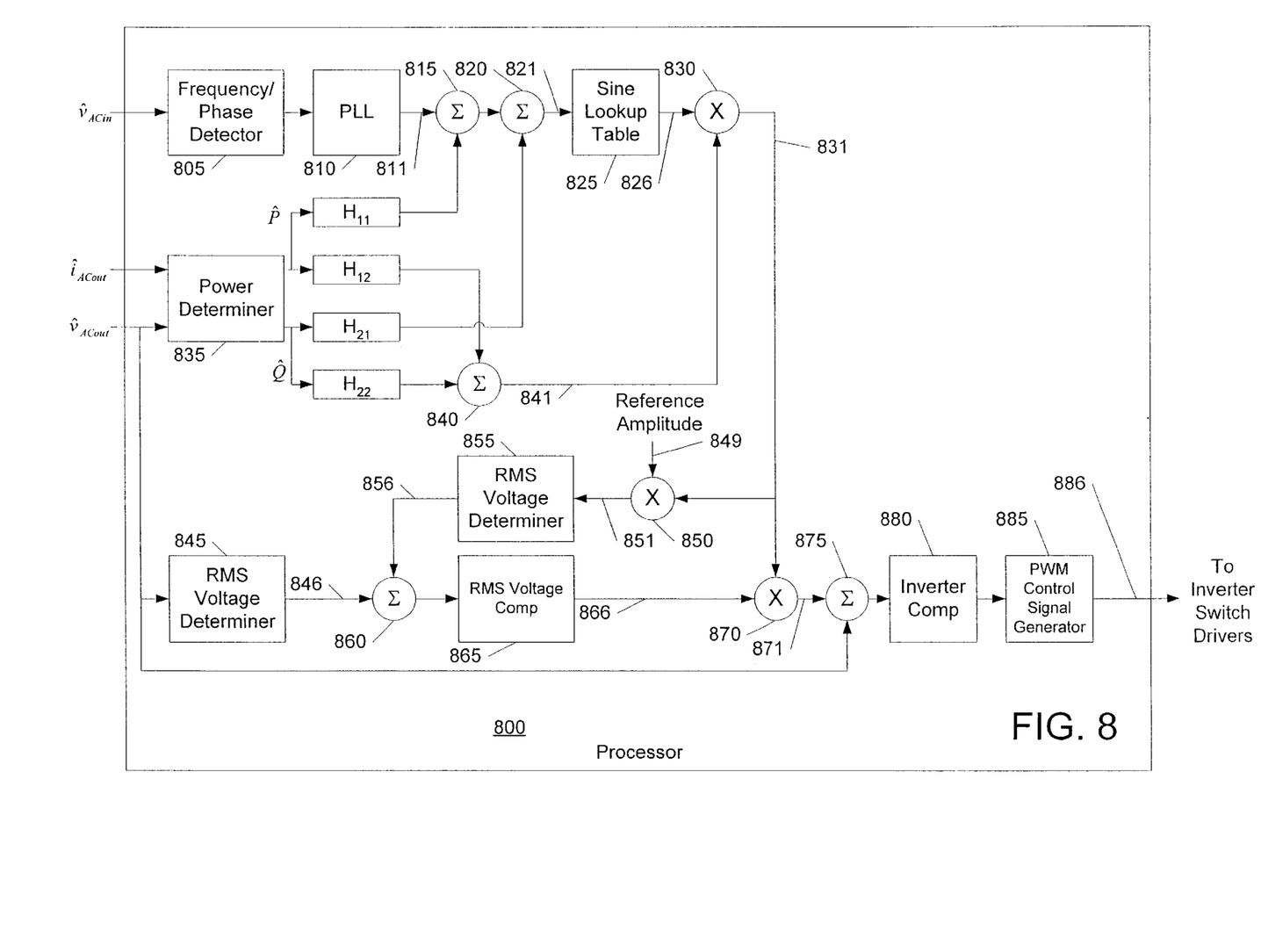
FIG. 8 is a schematic diagram illustrating a controller for use in the apparatus of FIG. 7 according to some embodiments of the invention.

According to still other embodiments of the invention illustrated in FIGS. 7 and 8, "fast" and "slow" voltage control along the lines illustrated in FIGS. 5 and 6 can be combined. In particular, FIG. 7 illustrates an UPS system 700 that includes a DC voltage generating circuit, here shown as including a rectifier circuit 710 that generates a DC voltage $v_{DC}$ from an AC input (e.g., utility) voltage $v_{ACin}$ and a battery converter circuit 720 that generates the DC voltage $v_{DC}$ from a battery voltage $v_{BATT}$ in an auxiliary (backup) fashion. It will be appreciated that the specific input structure 710, 720 of the UPS system 700 is provided for illustrative purposes, and that other circuit configurations may be used within the scope of the invention. The UPS system 700 also includes an inverter 730 that is operative to generate an AC voltage $v_{ACout}$ at an output 732 thereof from the DC voltage $v_{DC}$ responsive to an inverter control signal 747. The output 732 of the inverter 730 is connected to first and second nodes 30a, 30b, e.g., nodes at which the UPS system 700 is parallel connected to other UPS systems. For example, the control signal 747 may include one or more transistor drive signals that control an output current $i_{ACout}$ between the UPS system 700 and the nodes 30a, 30b.

The UPS system 700 further includes a UPS controller circuit 740 that is operative to produce the inverter control signal 747. The UPS controller circuit 740 includes a reference signal generator circuit 742 that generates a phase reference signal 743, e.g., a sine lookup table index signal, from an estimate $\hat{v}_{ACin}$ of the AC input voltage $v_{ACin}$ (or from an internal reference signal should the AC input voltage $v_{ACin}$ fail). The phase reference signal 743 is representative of a desired phase for a voltage at the nodes 30A, 30b. The UPS controller circuit 740 also includes a power determiner circuit 748 that is operative to produce respective estimates $\hat{P},\hat{Q}$ of instantaneous real and reactive power transferred between the output 732 of the inverter 730 and the nodes 30a, 30b. The power determiner circuit 748 produces the estimates $\hat{P},\hat{Q}$ of instantaneous real and reactive power responsive to estimates $\hat{v}_{ACout}, \hat{v}_{ACout}$ of the AC voltage and current $v_{ACout}, i_{ACout}$, and to the reference signal 743. The UPS controller circuit 740 further includes a reference signal compensator circuit 744 that receives the reference signal 743 and produces a compensated reference signal 745 according to the instantaneous real and reactive power estimates $\hat{P},\hat{Q}$. The compensated reference signal 745 is provided to the reference input (e.g., a voltage control loop input) of an inverter controller circuit 746 that generates the inverter control signal 747.

FIG. 8 illustrates a controller configuration that may be used for the UPS controller circuit 740 of the UPS system 700 of FIG. 7. The controller includes a processor 800, e.g., a microprocessor, controller or DSP and associated storage medium, in which a plurality of functional modules or blocks 805–885 are implemented. A frequency/phase detector module 805 detects a frequency and phase of the AC (utility) voltage $v_{ACin}$ from a representation $\hat{v}_{ACin}$ thereof. The detected frequency and phase are provided to a phase lock loop (PLL) module 810 that produces a reference signal 811 that approximately represents the frequency and phase of the AC input voltage $v_{ACin}$.

Estimates (e.g., sample values) $\hat{v}_{ACin}, \hat{i}_{ACout}$ of the AC voltage and current at the output 732 of the inverter 730 are processed by a power determiner module 835, which generates estimates $\hat{P},\hat{Q}$ of real and instantaneous reactive power transferred between the UPS system 700 and the nodes 30a, 30b. The instantaneous real and reactive power estimates $\hat{P},\hat{Q}$ are processed in compensation modules H11, H21 to produce respective signals that are applied to summing modules 815, 820 to modify the reference signal 811, thus producing a signal 821 that is time-shifted based on the estimates $\hat{P},\hat{Q}$ of instantaneous real and reactive power. The signal 821 is then provided to a sine lookup table module 825 that produces a sinusoidal signal 826 having a phase that is controlled responsive to the estimates $\hat{P},\hat{Q}$ of instantaneous real and reactive power. The instantaneous real and reactive power estimates $\hat{P},\hat{Q}$ are processed in compensation modules H12, H22 to produce respective signals that are applied to a summing module 840 to produce a signal 841 that is applied to a multiplier circuit module 830, where it amplitude modulates the sinusoidal signal 826 to produce a sinusoidal signal 831 that is time shifted and amplitude modulated based on the estimates $\hat{P},\hat{Q}$ of instantaneous real and reactive power.

This signal is appropriately scaled by a reference amplitude 849 in a multiplier circuit module 850 to produce a scaled sinusoidal reference signal 851. The scaled sinusoidal reference signal 851 is applied to an RMS voltage determiner module 855, which produces an RMS reference signal 856 for input into an RMS voltage control loop at a summing module 860. The estimate $\hat{v}_{ACout}$ of the voltage at the output 731 of the inverter 730 is also provided to an RMS voltage determiner module 845, which produces an RMS voltage feedback signal 846 that is representative of the RMS voltage at the output 732 of the inverter 730. The RMS voltage feedback signal 846 is provided to the RMS voltage loop at the summing module 860.

The output of the summing module 860 is provided to an RMS voltage compensation module 865. The RMS voltage compensation module 866 produces a compensation signal 866 that is used to scale the time-shifted and amplitude modulated signal 831 in a multiplier circuit module 870. The signal 871 produced by the multiplier circuit module 870 is applied to the input of a fast voltage control loop at a summing module 875, where it is compared with the voltage feedback signal $\hat{v}_{ACout}$. The output of the summing module 875 is applied to an inverter compensation module 880, which generates an input for a pulse width modulator (PWM) control signal generator circuit 885 that generates a control signal 886 (e.g., switching signal) for driving the inverter 730.

As can be seen, the controller configuration of FIG. 8 can provide power-compensated fast (inter-cycle) and slow (multi-cycle) voltage control loops. In particular, generation of the sinusoidal signal 831 may be viewed as providing "fast" inter-cycle time-shifting and amplitude modulation based on the real and instantaneous reactive power estimates $\hat{P},\hat{Q}$, while generation of the RMS scaling signal 866 may be viewed as providing "slow" RMS (i.e., cumulative, multi-cycle) compensation based on the real and instantaneous reactive power estimates $\hat{P},\hat{Q}$.

It will be appreciated that the control configuration illustrated in FIGS. 7 and 8 can be augmented, simplified or otherwise modified within the scope of the invention. For example, based on an assumption that real power may be more closely correlated with output voltage phase/frequency than output voltage amplitude and that reactive power may be more closely correlated with output voltage amplitude than with output voltage phase/frequency, the control structure of FIG. 8 may be modified such that the compensated reference signal provided to the outer voltage loop of the inverter (shown at the summing module 870 of FIG. 8) is preferentially time-shifted responsive to the real power estimate $\hat{P}$ and preferentially amplitude modulated responsive to the reactive power estimate $\hat{Q}$. For example, this may be achieved by eliminating the compensation modules H12, H21. In still other embodiments of the invention, it may be desirable to selectively enable the compensation modules H11, H12, H21, H22. For example, it may be advantageous to enable the compensation module H12 when the real power estimate $\hat{P}$ indicates negative real power output from the UPS 700 (i.e., net real power input to the UPS 700), and to disable the compensation module H12 when the real power estimate $\hat{P}$ indicates a positive real power output from the UPS 700 (i.e., such that the reference signal 831 is not amplitude modulated according to the real power estimate $\hat{P}$ under such conditions). Such an implementation may improve steady-state voltage regulation at the nodes 30a, 30b.

In the drawings and foregoing description thereof, there have been disclosed typical embodiments of the invention. Terms employed in the description are used in a generic and descriptive sense and not for purposes of limitation, the scope of the invention being set forth in the following claims.

That which is claimed is:

1. An AC power supply, comprising:
   an output;
   a reference signal generator circuit operative to generate a reference signal representative of a desired voltage waveform at a node connected to the output;
   a power determiner circuit operative to generate an estimate of instantaneous reactive power transferred between the output and the node;
   a reference signal compensator circuit operative to generate a compensated reference signal from the reference signal responsive to the estimate of instantaneous reactive power; and
   an AC voltage generator circuit operative to transfer current between the output and the node responsive to the compensated reference signal.

2. A power supply according to claim 1, wherein the power determiner circuit is operative to generate the estimate of instantaneous reactive power from an estimate of instantaneous current and an estimate of instantaneous voltage at the output of the AC power supply.

3. A power supply according to claim 2:
   wherein the reference signal comprises a first sinusoidal reference signal having a frequency and phase indicative of a frequency and phase of the desired voltage waveform at the node; and
   wherein the power determiner circuit includes:
      a first multiplier operative to multiply the sinusoidal reference signal by an estimate of voltage at the output of the AC power supply to produce a second sinusoidal reference signal that is representative of the instantaneous voltage;
      a phase shifter circuit operative to process the second sinusoidal reference signal to produce a third sinusoidal reference signal that is quadrature phase shifted with respect to the second sinusoidal reference signal; and
      a second multiplier operative to multiply the third sinusoidal reference signal by the estimate of instantaneous current to produce the estimate of instantaneous reactive power.

4. A power supply according to claim 1, wherein the reference signal compensator circuit is operative to generate the compensated reference signal by time-shifting and/or amplitude modulating the reference signal responsive to the estimate of instantaneous reactive power.

5. A power supply according to claim 4:
   wherein the reference signal comprises a first periodic signal;
   wherein the reference signal compensator circuit is operative to amplitude modulate the first periodic signal responsive to the estimate of instantaneous reactive power to generate a second periodic signal; and
   wherein the AC voltage generator circuit is operative to control current transfer between the output and the node responsive to the second periodic signal.

6. A power supply according to claim 5:
   wherein the power determiner circuit is further operative to generate an estimate of instantaneous real power transferred between the output and the node; and
   wherein the reference signal generator circuit is operative to amplitude modulate the first periodic signal responsive to the estimate of instantaneous reactive power and the estimate of instantaneous real power.

7. A power supply according to claim 6, wherein the reference signal generator circuit is operative to amplitude modulate the first periodic reference signal responsive to the estimate of instantaneous real power when the estimate of instantaneous real power meets a first predetermined criterion, and wherein the reference signal generator circuit is operative to prevent amplitude modulation of the first periodic reference signal responsive to the estimate of instantaneous real power when the estimate of instantaneous real power meets a second predetermined criterion.

8. A power supply according to claim 5:
wherein the reference signal compensator circuit is operative to process an RMS voltage reference signal according the estimate of instantaneous reactive power to generate a compensated RMS voltage reference signal;
wherein the power supply further comprises:
an RMS voltage determiner circuit operative to generate an RMS voltage signal representative of an RMS voltage at the output;
a summing circuit that generates an RMS voltage error signal from the RMS voltage signal and the compensated RMS voltage reference signal; and
an RMS voltage compensation circuit operative to process the RMS voltage error signal according to a predetermined compensation to produce an RMS voltage compensation signal; and
wherein the reference signal compensator circuit is further operative to amplitude modulate the first periodic signal according to the RMS voltage compensation signal to produce the second periodic signal.

9. A power supply according to claim 8:
wherein the reference signal compensator circuit is operative to time shift and/or amplitude modulate the first periodic signal responsive to the estimate of instantaneous reactive power to generate a compensated periodic signal and to generate the compensated RMS voltage reference signal responsive to the compensated periodic signal; and
wherein the reference signal compensator circuit is operative to amplitude modulate the compensated periodic signal according to the RMS voltage compensation signal to produce the second periodic signal.

10. A power supply according to claim 4:
wherein the reference signal compensator circuit is operative to generate a first sinusoidal signal from the reference signal and to amplitude modulate the first sinusoidal signal responsive to the estimate of instantaneous reactive power to generate a second sinusoidal signal; and
wherein the AC voltage generator circuit is operative to control current transfer between the output and the node responsive to the second sinusoidal signal.

11. A power supply according to claim 10, wherein the first and second sinusoidal signals are digital approximations of continuous sinusoids.

12. A power supply according to claim 10, wherein the reference signal compensator circuit is further operative to time shift the first sinusoidal signal responsive to the estimate of instantaneous reactive power.

13. A power supply according to claim 12, wherein the reference signal compensator circuit is operative to time shift the first sinusoidal signal responsive to the estimate of instantaneous reactive power and to an estimate of instantaneous real power transferred between the output and the node.

14. A power supply according to claim 10:
wherein the reference signal comprises a first index signal;
wherein the reference signal compensator circuit comprises:
a first compensation circuit operative to process the estimate of instantaneous reactive power according to a first compensation to generate a first compensation signal;
a summing circuit operative to modify the first index signal responsive to the first compensation signal factor to produce a second index signal that is time-shifted with respect to the first index signal;
a sine lookup table circuit operative to generate the first sinusoidal signal responsive to the second index signal;
a second compensation circuit operative to process the estimate of instantaneous reactive power according to a second compensation to produce a second compensation signal; and
a multiplier circuit operative to amplitude modulate the first sinusoidal signal responsive to the second compensation signal to produce the second sinusoidal signal.

15. A power supply according to claim 14:
wherein the reference signal compensator circuit further comprises:
a third compensation circuit operative to process an estimate of instantaneous real power transferred between the output and the node according to a third compensation to produce a third compensation signal; and
a fourth compensation circuit operative to process the estimate of instantaneous real power according to a fourth compensation to produce a fourth compensation signal;
wherein the summing circuit is operative to modify the first index signal responsive to the first and third compensation signals to produce the second index signal; and
wherein the multiplier circuit is operative to amplitude modulate the first sinusoidal signal responsive to the second and fourth compensation signals to generate the second sinusoidal signal.

16. A power supply according to claim 1, wherein the AC voltage generator circuit comprises a controlled inverter.

17. A power supply according to claim 16, wherein the controlled inverter comprises an output voltage control loop that receives the compensate reference signal at a reference input thereof.

18. An AC power supply, comprising:
an output;
means for generating a reference signal representative of a desired voltage waveform at a node connected to the output;
means for generating a compensated reference signal from the reference signal responsive to an estimate of instantaneous reactive power transferred between the output and the node; and
means for controlling current transfer between a power source and the node via the output responsive to the compensated reference signal.

19. A power supply according to claim 18, further comprising means for generating the estimate of instantaneous reactive power from an estimate of instantaneous current and an estimate of instantaneous voltage at the output of the AC power supply.

20. A power supply according to claim 19:
wherein the reference signal comprises a first sinusoidal reference signal having a frequency and phase indicative of a frequency and phase of the desired voltage waveform at the node; and
wherein the means for generating the estimate of instantaneous reactive power from an estimate of instantaneous current and an estimate of instantaneous voltage comprises:

means for multiplying the sinusoidal reference signal by an estimate of voltage at the output to produce a second sinusoidal reference signal representative of the instantaneous voltage;

means for processing the second sinusoidal reference signal to produce a third sinusoidal reference signal that is quadrature phase shifted with respect to the second sinusoidal reference signal; and means for multiplying the third sinusoidal reference signal by the estimate of instantaneous current to produce the estimate of instantaneous reactive power.

21. A power supply according to claim 18, wherein the means for generating a compensated reference signal comprises means for generated the compensated reference signal from the reference signal responsive to the estimate of instantaneous reactive power transferred between the output and the node and to an estimate of instantaneous real power transferred between the output and the node.

22. An uninterruptible power supply (UPS), comprising:
a DC voltage generating circuit configured to connect to an AC power source and to an auxiliary power source and operative to produce a DC voltage circuit at a DC bus from the AC power source and/or the auxiliary power source;
a controlled inverter coupled to the DC bus and operative to produce an AC voltage at an output thereof from the DC voltage on the DC bus responsive to a signal applied to a reference input of the controlled inverter;
a reference signal generator circuit operative to generate a reference signal representative of a desired voltage waveform at a node connected to the output of the controlled inverter;
a power determiner circuit operative to generate an estimate of instantaneous reactive power transferred between the output of the inverter and the node; and
a reference signal compensator circuit responsive to the reference signal generator circuit and to the power determiner circuit and operative to generate a compensated reference signal at the reference input of the controlled inverter from the reference signal responsive to the estimate of instantaneous reactive power.

23. A UPS according to claim 22, wherein the power determiner circuit is operative to generate the estimate of instantaneous reactive power from an estimate of instantaneous current and an estimate of instantaneous voltage at the output of the controlled inverter.

24. A UPS according to claim 22:
wherein the reference signal comprises a first sinusoidal reference signal having a frequency and phase indicative of a frequency and phase of the desired voltage waveform at the node; and
wherein the power determiner circuit includes:
a first multiplier operative to multiply the sinusoidal reference signal by an estimate of voltage at the output to produce a second sinusoidal reference signal representative of the instantaneous voltage;
a phase shifter circuit operative to process the second sinusoidal reference signal to produce a third sinusoidal reference signal that is quadrature phase shifted with respect to the second sinusoidal reference signal; and
a second multiplier operative to multiply the third sinusoidal reference signal by the estimate of instantaneous current to produce the estimate of instantaneous reactive power.

25. A UPS according to claim 22:
wherein the power determiner circuit is operative to generate an estimate of instantaneous real power transferred between the output of the inverter and the node; and
wherein the reference signal compensator circuit is operative to generate the compensated reference signal from the reference signal responsive to the estimate of instantaneous reactive power and to the estimate of instantaneous real power.

26. A method of operating an AC power supply, the method comprising:
generating a reference signal representative of a desired voltage waveform at a node connected to an output of the AC power supply;
modifying the reference signal responsive to an estimate of instantaneous reactive power transferred between the output and the node to generate a compensated reference signal; and
controlling current transfer between the output and the node responsive to the compensated reference signal.

27. A method according to claim 26, further comprising generating the estimate of instantaneous reactive power from an estimate of instantaneous current and an estimate of instantaneous voltage at the output of the AC power supply.

28. A method according to claim 27:
wherein the reference signal comprises a first sinusoidal reference signal having a frequency and phase indicative of a frequency and phase of the desired voltage waveform at the node; and
wherein generating the estimate of instantaneous reactive power from an estimate of instantaneous current and an estimate of instantaneous voltage comprises:
multiplying the sinusoidal reference signal by an estimate of a voltage at the output to produce a second sinusoidal reference signal representative of the instantaneous voltage;
processing the second sinusoidal reference signal to produce a third sinusoidal reference signal that is quadrature phase shifted with respect to the second sinusoidal reference signal; and
multiplying the third sinusoidal reference signal by the estimate of instantaneous current to produce the estimate of instantaneous reactive power.

29. A method according to claim 26, wherein modifying the reference signal comprises time-shifting and/or amplitude modulating the reference signal responsive to the estimate of instantaneous reactive power.

30. A method according to claim 29:
wherein the reference signal comprises a first periodic signal;
wherein time shifting and/or amplitude modulating the reference signal comprises amplitude modulating the first periodic signal responsive to the estimate of instantaneous reactive power to generate a second periodic signal; and
wherein controlling current transfer between the output and the node comprises controlling current transfer between the output and the node responsive to the second periodic signal.

31. A method according to claim 30, wherein amplitude modulating the first periodic signal comprises amplitude modulating the first periodic signal responsive to the estimate of instantaneous reactive power and an estimate of instantaneous real power transferred between the output and the node.

32. A method according to claim 31, further comprising preventing amplitude modulation of the first periodic signal responsive to the estimate of instantaneous real power when the estimate of instantaneous real power meets a predetermined criterion.

33. A method according to claim 30, wherein time shifting and/or amplitude modulating the reference signal comprises:
processing an RMS voltage reference signal according the estimate of instantaneous reactive power to generate a compensated RMS voltage reference signal;
summing an RMS voltage signal representative of an RMS voltage at the output and the compensated RMS voltage reference signal to generate an RMS voltage error signal;
processing the RMS voltage error signal according to a predetermined compensation to produce an RMS voltage compensation signal; and
amplitude modulating the first periodic signal according to the RMS voltage compensation signal to produce the second periodic signal.

34. A method according to claim 33, wherein time shifting and/or amplitude modulating the reference signal further comprises:
time shifting and/or amplitude modulating the first periodic signal responsive to the estimate of instantaneous reactive power to generate a compensated periodic signal;
generating the compensated RMS voltage reference signal responsive to the compensated periodic signal; and
amplitude modulating the compensated periodic signal according to the RMS voltage compensation signal to produce the second periodic signal.

35. A method according to claim 29:
wherein time shifting and/or amplitude modulating the reference signal comprises:
generating a first sinusoidal signal from the reference signal; and
amplitude modulating the first sinusoidal signal responsive to the estimate of instantaneous reactive power to generate a second sinusoidal signal; and
wherein controlling power transfer between the output and the node comprises controlling power transfer between the output and the node responsive to the second sinusoidal signal.

36. A method according to claim 35, wherein the first and second sinusoidal signals are digital approximations of continuous sinusoids.

37. A method according to claim 35, wherein generating a first sinusoidal signal comprises time-shifting the first sinusoidal signal responsive to the estimate of instantaneous reactive power.

38. A method according to claim 37, wherein generating a first sinusoidal signal comprises time-shifting the first sinusoidal signal responsive to the estimate of instantaneous reactive power and an estimate of instantaneous real power transferred between the output and the node.

39. A method according to claim 35:
wherein the reference signal comprises a first index signal, and wherein generating a first sinusoidal signal comprises:
processing the estimate of instantaneous reactive power according to a first compensation to generate a first compensation signal;
summing the first index signal and the first compensation signal to generate a second index signal that is time shifted with respect to the first index signal; and
processing the second index signal according to a sine lookup table to generate the first sinusoidal signal; and
wherein amplitude modulating the first sinusoidal signal comprises:
processing the estimate of instantaneous reactive power according to a second compensation to generate a second compensation signal; and
multiplying the first sinusoidal signal by the second compensation signal to generate the second sinusoidal signal.

40. A method according to claim 39:
wherein generating a first sinusoidal signal further comprises processing an estimate of real power transferred between the output and the node according to a third compensation to generate a third compensation signal;
wherein summing the first index signal and the first compensation signal comprises summing the first index signal, the first compensation signal and the second compensation signal to generate the second index signal;
wherein amplitude modulating the first sinusoidal signal further comprises processing the estimate of real power according to a fourth compensation to generate a fourth compensation factor; and
wherein multiplying the first sinusoidal signal comprises multiplying the first sinusoidal signals by the second and fourth compensation signals to generate the second sinusoidal signal.

41. A method according to claim 26, wherein the AC power supply comprises an uninterruptible power supply (UPS) configured to receive an AC input voltage and operative to generate an AC voltage at the output of the AC power supply therefrom, and wherein generating a reference signal comprises synchronizing the reference signal to the AC input voltage.

42. A method according to claim 26, wherein controlling current transfer between the output and the node comprises controlling an inverter having an output that is coupled to the node responsive to the compensated reference signal.

43. A method according to claim 42, wherein controlling an inverter comprises controlling a reference input of an inverter output voltage control loop responsive to the compensated reference signal.

44. A method according to claim 26, further comprising coupling the AC power supply to at least one other AC power supply and a load at the node.

45. A method according to claim 44, wherein the at least one other AC power supply comprises an AC utility source coupled to the node via a bypass circuit.

* * * * *